(12) United States Patent
Tsuchida et al.

(10) Patent No.: US 6,829,623 B2
(45) Date of Patent: *Dec. 7, 2004

(54) METHOD AND SYSTEM FOR MANAGING MULTIPLE DATABASE STORAGE UNITS

(75) Inventors: Masashi Tsuchida, Machida (JP); Nobuo Kawamura, Atsugi (JP); Nobuyuki Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 09/944,262

(22) Filed: Aug. 31, 2001

(65) Prior Publication Data

US 2002/0107876 A1 Aug. 8, 2002

Related U.S. Application Data

(63) Continuation of application No. 09/907,049, filed on Jul. 17, 2001.

(30) Foreign Application Priority Data

Sep. 8, 2000 (JP) ........................................ 2000-278671

(51) Int. Cl.[7] .............................................. G06F 17/30
(52) U.S. Cl. ............................... 707/204; 707/1; 707/2; 707/4; 707/8; 707/10; 707/100
(58) Field of Search .............................. 707/3, 10, 100, 707/200, 201, 1, 2, 4, 8, 103 R, 104.1, 202, 204, 205; 717/161, 162; 370/299, 369, 372, 389, 395.4, 477, 503, 539; 705/21, 30; 709/202, 203, 204, 208, 211, 219, 221, 223, 231, 232, 234, 318, 328; 711/112, 114, 154, 162

(56) References Cited

U.S. PATENT DOCUMENTS 5,737,601 A * 4/1998 Jain et al. .................... 707/201
5,799,305 A * 8/1998 Bortvedt et al. ............... 707/10
6,212,529 B1 * 4/2001 Boothby et al. ............. 707/201
6,298,425 B1 * 10/2001 Whitaker et al. ........... 711/162

OTHER PUBLICATIONS

C.J. Date; 1990; An Introduction to Database Systems; vol. 1; Chapter 23–Chapter 24; pp. 616–641.

Bruce Lindsay; 1993; Transaction Processing: Concepts and Techniques; The Morgan Kaufmann Series in Data Mangaement Systems; pp. 644–655.

David A. Patterson, Garth Gibson and Randy H. Katz; 1988; A Case for Redundant Arrays of Inexpensive Disks (RAID); pp. 109–116.

* cited by examiner

Primary Examiner—Shahid Alam
Assistant Examiner—Fred Ehichioya
(74) Attorney, Agent, or Firm—Knoble Yoshida & Dunleavy

(57) ABSTRACT

The system manages at least a database in multiple database storage units, and the database is duplicated for redundancy. The system maintains the database redundancy for security. The system enables the maintenance and reorganization of the database storage units without interrupting the on-going operations involving the access to the database storage units. The non-stop ongoing database access is available by allocating a pair of a main storage unit and an intermediate storage unit that maintains the substantially identical data. During certain predetermined operations, the main storage unit is being dedicating to the on-going transactions while the intermediate database storage unit is manipulated to contain data that corresponds to a specified time. For example, the content of the intermediate storage is subsequently copied or used to update another database. When the above duplication or incorporation is completed, the intermediate storage unit is updated for the transactions that have taken place during the above operations to be synchronized with the main storage unit.

23 Claims, 15 Drawing Sheets

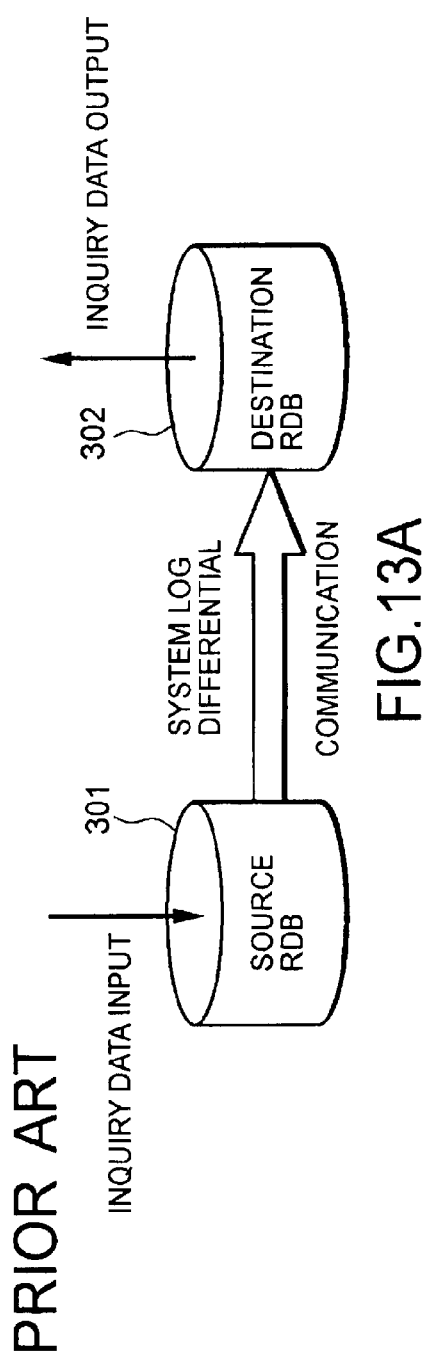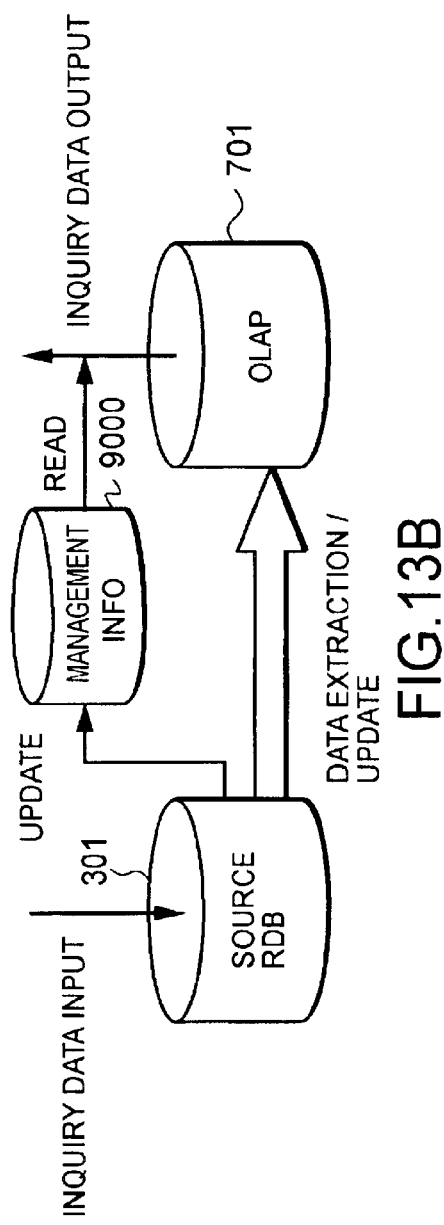

METHOD AND SYSTEM FOR MANAGING MULTIPLE DATABASE STORAGE UNITS

This is a continuation of prior application Ser. No. 09/907,049 filed on Jul. 17, 2001 under 35 C.F.R. 1.53(b).

FIELD OF THE INVENTION

The current invention is generally related to managing multiple database storage units, and more particularly related to managing multiple database storage units to duplicate the database without interrupting the on-going operations involving the access to the database storage units.

BACKGROUND OF THE INVENTION

High availability (HA) systems have multiple structures. A database management system is duplicated as a high performance solution in order to avoid a complete shutdown due to a power failure or a CPU failure in one database management system. For example, Jim Gray and Andreas Reuter (1993) disclosed hot-standby non-stop operations as a database failure solution based upon the HA system. (Transaction Processing: Concepts and Techniques, Morgan Kaufmann Publishers, 1993). In order to secure high reliability in disk devices, Redundant Array of Inexpensive Disks (RAID) are also combined. Patterson et al. (1988) disclosed the RAID structures in details. (A Case for Redundant Array of Inexpensive Disks, ACM SIGMOD, 1988). Furthermore, a replica database is based upon a common access function for accessing distributed systems. For example, Date (1990) disclosed the above replica database technologies. (An Introduction to Database Systems: Volume 1, Fifth Edition, Addison-Wesley Publisher, 1990).

Despite the above described prior art technologies, it is still necessary to respond to an enormous change in the database amount, the users as well as the data load in the current computing environment. The current environment includes a Web site that is simultaneously accessed by over several tens of thousands of users and or DWH systems that manage large databases with daily addition of over ten TB of analysis data. Although it is possible to initially design a system based upon data division methods, the memory amount, the number of processors and servers, and disk distribution, it is necessary to minimize the initial configuration of the system for the least start-up cost. For this reason, the initial database is redesigned and reconfigured when the database data amount and the number of users increased. To accomplish the redesign and reconfiguration, in the prior art, the operation of the database system is at least temporarily terminated while the data division method, the memory amount, the number of processors and servers as well as the disk storage amount are being reconfigured in accordance with the necessary modifications.

The reason for ceasing the database operations includes a number of factors. For example, in response to ever increasing services and access from clients such as Web browsers, it is necessary to add a server in the database management system to process the above described demands. The database data amount also has ever increased due to increased client service, increased application programs as well as diversified views or reports from the database. Due to these factors, it is necessary to add disk storage units for storing the increased database. It is also necessary to equalize the database access load modifying a schema for data division methods. Furthermore, it is necessary to periodically reconfigure the database in order to prevent search efficiency from declining due to an imbalanced database structure that is caused by certain operations such as the deletion of a large amount of data from the database.

The above described operations for maintenance and or reconfiguration are generally performed while the database system is shut down at night or runs the batch operation during the weekend. However, since database systems on the Web are usually globally accessed for twenty-four hours a day, it is not possible to cease the database operations at night or to run the batch operation. For this reason, it is desired to perform the above described maintenance/reconfiguration in parallel with the database access without interfering the database operations. Furthermore, it is also desired to summarize the statistical trends of the activities with respect to the database while the database system is continuously operated.

SUMMARY OF THE INVENTION

In order to solve the above and other problems, according to a first aspect of the current invention, a method of managing a plurality of databases in response to continuous transactions, the databases including at least a first database and a second database, including: maintaining a duplicate pair of first data and second data in a first format in the first database in response to database transactions; maintaining third data in a second format in the second database, the second format being organized to summarize the first data and the second data; determining a point in time for a predetermined database management task; discontinuing the database transactions to and from the first data in the first database; continuing the database transactions to and from the second data in the first database; rolling back the first data in the first database to the point in time; resolving the first data in the first database and the third data in the second database; rolling forward the first data in the first database to match the second data in the first database; and resuming the database transactions to and from the first data and the second data in the first database.

According to a second aspect of the current invention, A system for managing a plurality of databases in response to continuous transactions, the databases including at least a first database, a second database and a third database, including: a first database storage unit for storing first data in a first format in first database; a second database storage unit for storing a duplicate set of second data in the first format in second database; a third database storage unit for storing third data in a second format in third database, the third data summarizing the first data and the second data in the second format; an information management unit for storing fourth data on an updated status of the third with respect to the first data and the second data; and a database management unit connected to the first database storage unit, the second database storage unit and the third database storage unit for continuing database transactions to and from the first database as well as maintaining the first data in the first database and the duplicate set of the second data in the second database, the database management unit determining a point in time for a predetermined database management task and discontinuing the database transactions to and from the second database so as to roll back the second data in the second database to the point in time, the database management unit resolving the second data in the second database and the third data in the third database and recording the updated status in the information management unit, the database management unit rolling forward the second data in the second database to match the first data in the first database so as to resume the database transactions to and from the second database in the second database storage unit.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 13A illustrates a pair of a first relational database and a second relational database that contains a duplicate set of data.

FIG. 13B is a first relational database is functionally paired to an OLAP database along with an information management unit.

DETAILED DESCRIPTION OF THE PREFERRED EMBODIMENT(S)

In general, the database service is discontinued from time to time. For example, in response to increasing client access from Web browsers, it is necessary to add a server to process the increased demand for the database management system. Another example includes the increasing amount of data due to additional services to the clients via new software application programs. These new software application programs enable the user to see the data in a database in diversified manners. The increased data also requires that storage devices equally store approximately the same amount of the data so that the database access is also distributed among the storage devices. Furthermore, since certain data is deleted from the database, the database system also needs to be periodically arranged to maintain the balanced storage load. To maintain the database service in the above described environment, the following system is proposed.

Figure 1:
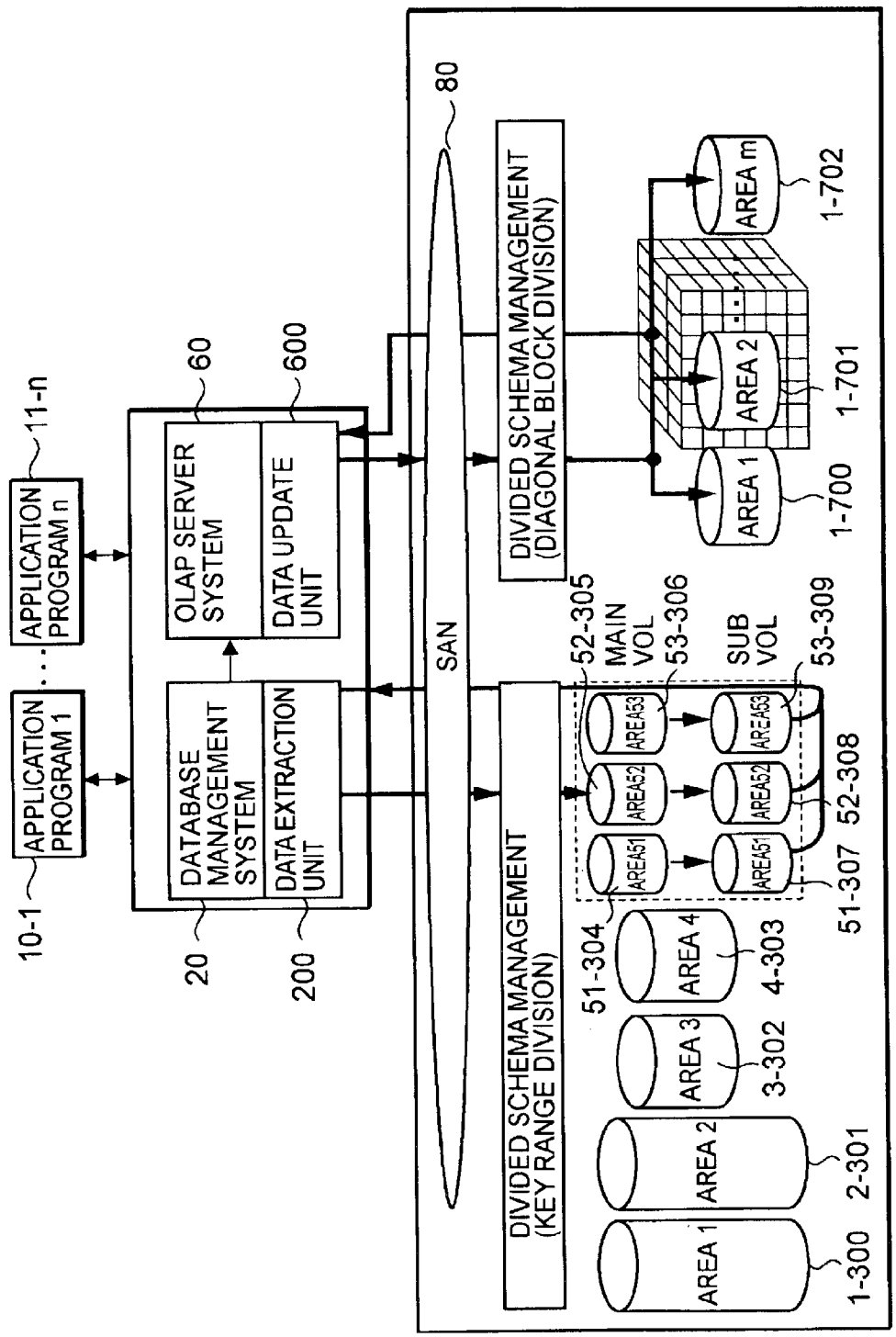
FIG. 1 is a diagram illustrating one preferred embodiment of the database system according to the current invention.

Referring now to the drawings, wherein like reference numerals designate corresponding structures throughout the views, and referring in particular to FIG. 1, a diagram illustrates one preferred embodiment of the database system according to the current invention. The preferred embodiment includes application programs 1 through n that access the database which is stored in a Storage Area Network (SAN) 80 and is accessed through a database management unit 20, a data extraction unit 200, an On Line Analytical Processing (OLAP) server system 60 and a data update unit 600. In general, a relational database system includes some of the application programs 1 through n, the data extraction unit 200 and the database management unit 20. On the other hand, the OLAP system generally includes others of the application programs 1 through n, the OLAP server system 60 and the data update unit 600.

Both the relational database and the OLAP systems are connected to the SAN 80. The relational database system utilizes the storage space that is divided in storage areas 1-300, 2-301, 3-302, 3-302, 4-303, 51-304, 52-305, 53-306, 51-307, 52-308 and 53-309. Further storage areas 51-304, 52-305, 53-306, 51-307, 52-308 and 53-309 are equipped with an automatic writing function, they are organized into a main volume that includes the storage areas 51-304, 52-305 and 53-306 and a sub volume that include the areas 51-307, 52-308 and 53-309 For example, if the database management unit 20 writes data in the storage areas 51-305, 52-305 and 53-306 in the main volume, the same data is automatically written in the areas 51-307, 52-308 in the sub volume as indicated by a set of arrows. The OLAP system includes divided storage areas 700-1, 700-2 and 700-m. Furthermore, in response to the above data write operation, the data extraction unit 200, the OLAP server 60 and the data update unit 600 together update the data in the storage areas 700-1, 700-2 and 700-m in OLAP system as also indicated by arrows to reflect the change in the relational database system. The OLAP system data update is performed according to a predetermined division scheme such as a diagonal block division scheme. Lastly, as indicated by another arrow, some of the application programs 10-1 through 11-n access the updated OLAP data in the storage areas 700-1, 700-2 and 700-m in the OLAP system.

The SAN 80 is designed to accommodate flexibility among storage devices. In order to avoid the discontinuance of the database service, the database management unit 20 must be able to provide the following characteristics such as scalability of storage space, sharing of the data and redundancy of the data. To provide the scalability, the storage device for storing databases and the server device for processing the database access operation should be independent, and the server or storage devices should be added or deleted without disturbing the continuous database operations. To provide the data sharing, a plurality of server devices shares a common storage area for accessing and updating irrespective of platforms that access the common data space. Lastly, to provide the redundancy, the database management system maintains a duplicate set of sensitive data or remotely copies at a distant location. The SAN 80 is considered to be one solution for implementing the above desired characteristics of performance, scalability, storage management efficiency and data protection.

Still generally referring to FIG. 1, one exemplary application of the above described preferred embodiment of the database system according to the current invention includes a real-time retail sales database system for managing a database from a large number of point-of-sales (POS) terminal devices that are located in various regions. The information in the database includes sales, inventory, purchase orders, product shipping schedules and so on. Since the chronological information is critical to provide commercially vital information such as a sales trend of certain products, the relational database is also generated based upon real-time sales data. Based upon the above generated relational database, it is also preferable to include the OLAP system that instantaneously provides multi-dimensional analyses of the relational data. To provide the instantaneous analyses, the OLAP system is coupled with the relational database system according to the current invention.

Figure 2:
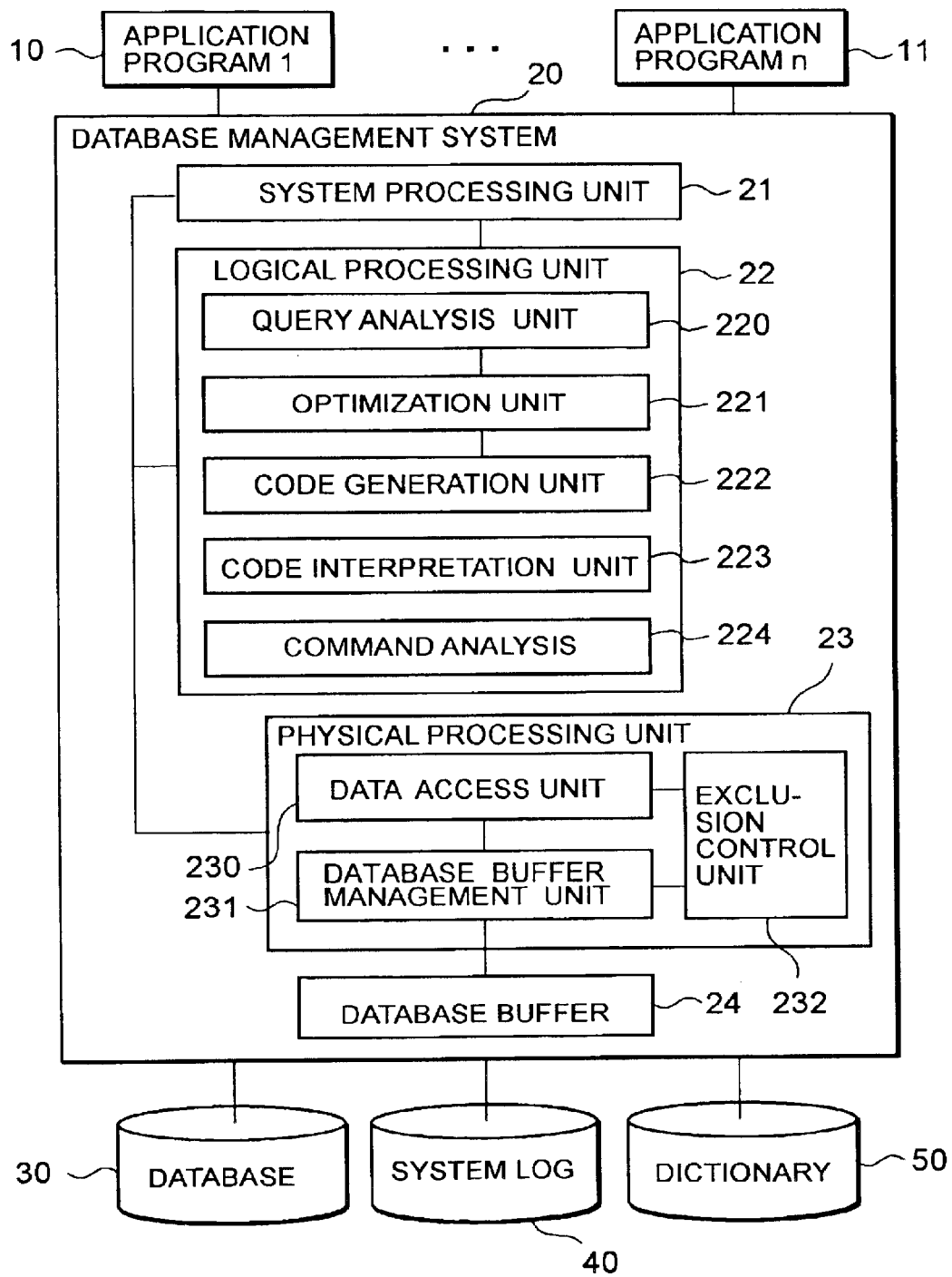
FIG. 2 is a block diagram illustrating one preferred embodiment of the database management unit according to the current invention.

Now referring to FIG. 2, a block diagram illustrates one preferred embodiment of the database management unit 20 according to the current invention. The preferred embodiment of the database management unit 20 includes a system control unit 21, a logic process unit 22, a physical process unit 23 as well as a data buffer unit 24. The database management unit 20 is connected to the application programs 10-1 to 11-n as well as a set of a database storage unit 30, a system log unit 40 and a dictionary storage unit 50 to provide interface and management functions. The database management unit 20 is also optionally connected to other database storage units via a network. The database storage unit 30, the system log unit 40 and the dictionary storage unit 50 are partially or entirely included in the SAN 80.

The database storage unit 30, the system log unit 40 and the dictionary storage unit 50 respectively contain a predetermined set of information. The database storage unit 30 contains information in predetermined database records. The dictionary storage unit 50 contains a list of information on the correlation between the stored areas and the content with an associated division schema or method that was used in storing the content. One example of a division method or schema is a key range division. Other examples include a hash division method, a round robin division method and a combination of the above methods. The list also contains information on the page size and the association between the main volume that includes the storage areas 51-305, 52-305 and 53-306 and the sub volume that include the areas 51-307, 52-308 and 53-309. Schema divided storage areas in the disk units of the server or OLAP server systems that are connected via the SAN 80 are mapped onto the storage areas in the main and sub volumes, and the information on the mapping is stored in the dictionary information in the dictionary unit 50. By updating the dictionary information, the area-volume mapping between the primary storage areas in the server or OLAP server systems and the secondary storage areas in the main and sub volumes is maintained. The above mapping information is organized in a table format with an index to an area name where the information is stored. The system log 40 stores records of each insertion, update and deletion of any record in the database stored in the database storage unit 30.

Still referring to FIG. 2, other units perform the following functions. The system control unit 21 accepts a query input from a user and returns the inquiry result. The system control unit 21 also maintains databases and controls other systems by executing commands such as a data load command, a data reconfiguration command and a rearrangement command. The logical processing unit 22 further includes an query analysis unit 220 for analyzing sentence structures and meaning; an optimization unit 221 for selecting an optimized process; and a code generation unit 222 for generating a code based upon the optimized process. The logical processing unit 22 also includes a code interpretation unit 222 for interpreting the generated code for execution. The logical processing unit 22 additionally includes a command analysis unit for executing commands such as a fixed command, a variable command, an area-volume mapping command and a main-sub volume control command. If a division method change command is executed, the information in the dictionary is updated. The physical processing unit 23 further includes a data access control unit 230, a database buffer management unit 231 and exclusion control unit 232. The data access control unit 230 accesses a specified piece of data and determines if a predetermined condition is met for the accessed data. The data access control unit 230 further edits and adds a data record. The database buffer management unit 231 controls the read and write access of the database records via the database buffer 24. The exclusion control unit 232 controls the exclusive access to the database during predetermined tasks.

Figure 3:
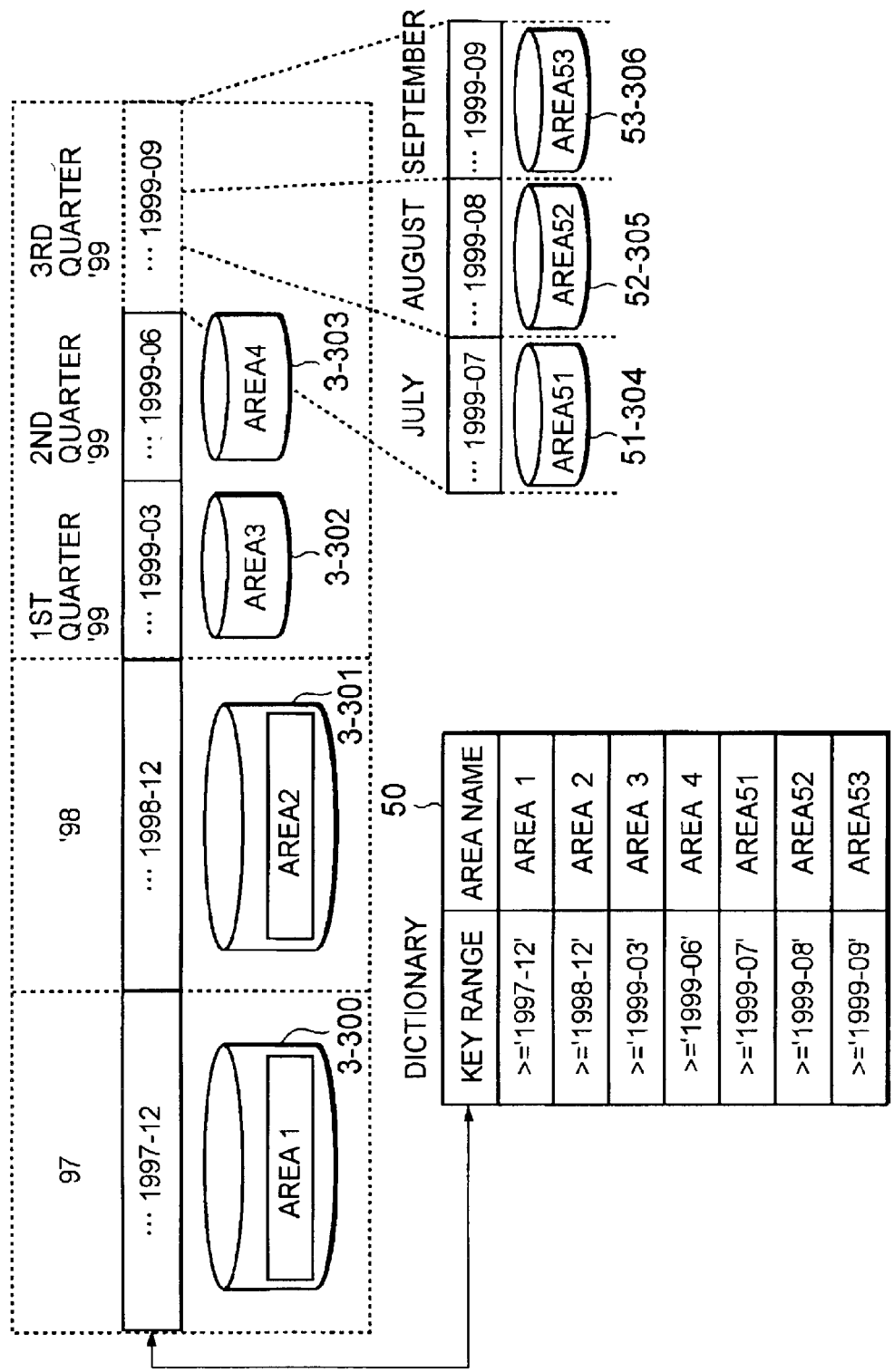
FIG. 3 is a diagram illustrating one example of chronologically organized sales records.

Now referring to FIG. 3, a diagram illustrates one example of chronologically organized sales records. The records are managed for each month, each quarter or four months and each year. For example, the sales records in the year, 1997 are organized and stored in Area 1 or 3-300 while those in the year, 1998 are organized and stored in Area 2 or 3-301. Similarly, the first two quarters of the year 1999 is stored respectively in Area 3 3-302 and Area 4 3-303. Each month of the third quarter of the year 1999 is stored respectively in Area 51 51-304 for July, Area 52 52-305 for August and Area 53 53-306 for September. The above relations between the storage areas and the stored data content are organized in the dictionary 50. The key range is a data description while the area name is a storage space. For example, the database is divided is based upon the following table definition sentences:

```
CREATE TABLE sales record table
(sales code      CHAR (16),
 sales item      CHAR (16),
 territory code  CHAR (16),
 time code       DATE,
 sales amount    DEC(10))
 IN ((area 1) time >='1997-12',
     (area 2) time >='1998-12',
     (area 3) time >='1999-03',
     (area 4) time >='1999-06',
     (area 51) time >='1999-07',
     (area 52) time >='1999-08',
     (area 53) time >='1999-09');
```

In the above example, no area is defined for the fourth quarter in the year 1999, the areas 51-304, 52-305 and 53-306 for respectively July, August and September, 1999 are considered as a combined fifth storage area.

Figure 4:
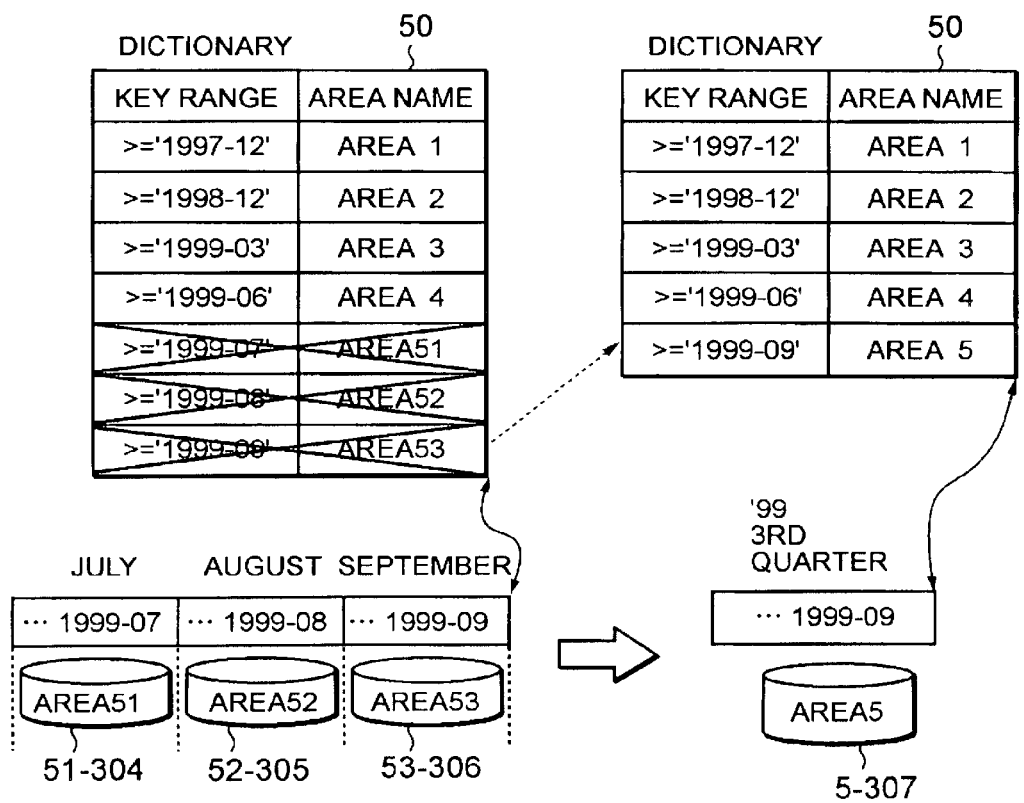
FIG. 4 is a diagram illustrating a database before and after a change in the database division method is made.

Now referring to FIG. 4, a diagram illustrates a database before and after a change in the database division method is made in September, 1999. For example, the following definition changes the data for July, August and September stored respectively in the areas 51-304, 52-305 and 53-306 to be combined into a single area 5-307 as a third quarter of 1999.

ALTER TABLE sales record table
  MERGE AREA (area 51-304, area-52-305, area 53-306)
  INTO ((area 5-307) time code >="1999-09');

As a result of the above change, the dictionary 50 now has a single entry for '1999-09' in the area 5, which includes the three previous entries for '1999-07,' '1999-08' and '1999-09' in the areas 51, 52 and 53.

Figure 5:
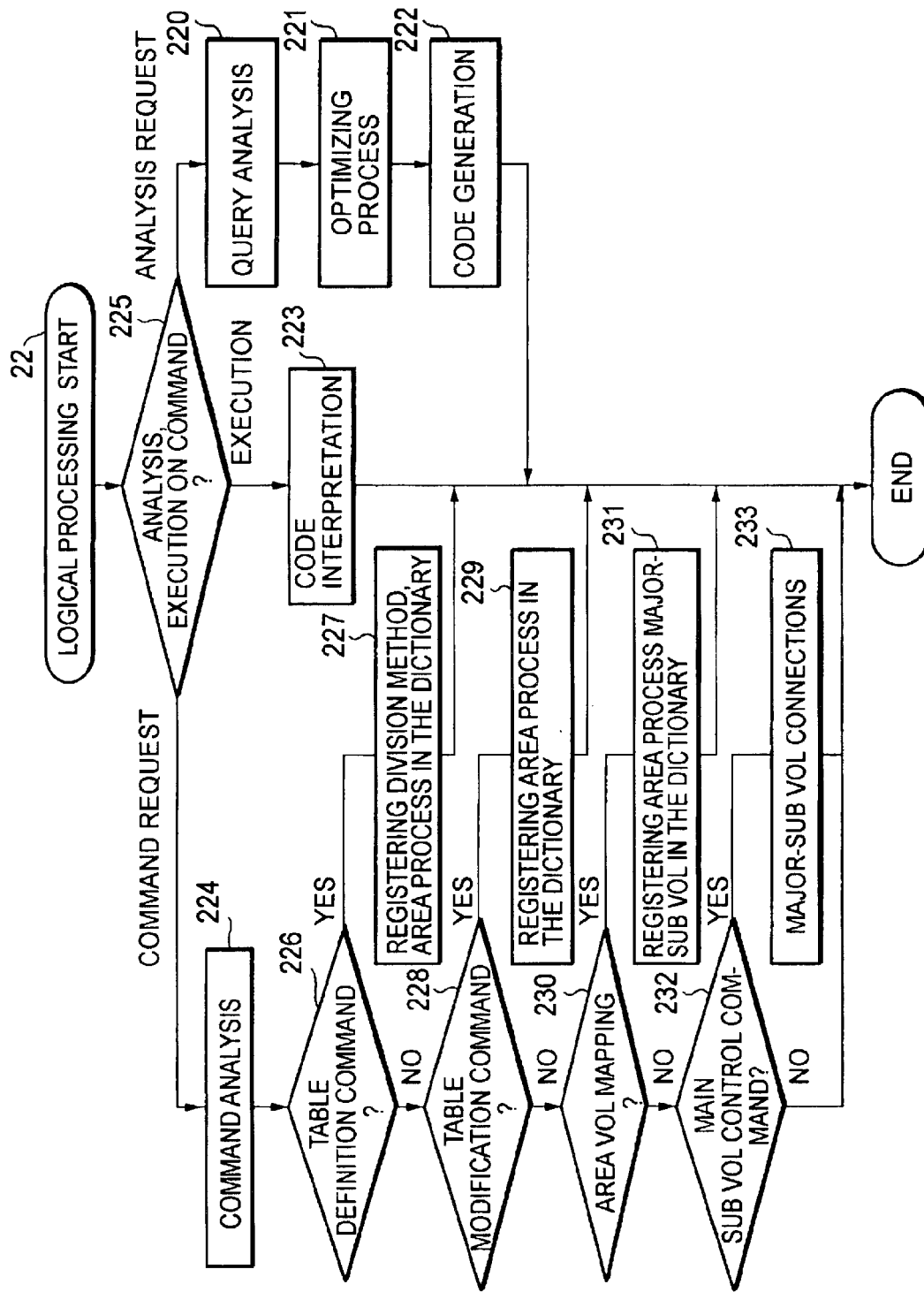
FIG. 5 is a flow chart illustrating the steps involved in a preferred process of processing a database management command according to the current invention.

FIG. 5 is a flow chart illustrating the steps involved in a preferred process of processing a database management command according to the current invention. The logical processing unit 22 of the database management unit 20 as shown in FIG. 2 processes the following steps. It is determined whether or not a command is an analysis request, a command request or an execution request in step 225. If it is a command request, the process proceeds to a step 224 for analyzing the command. If it is a table definition command in a step 226, a division method and each corresponding area are registered in the dictionary in a step 227 based upon the table definition command. If it is a table modification command in a step 228, a modification for each corresponding area is registered in the dictionary in a step 229 based upon the table modification command. If it is an area mapping command in a step 230, each area and the corresponding main and sub volumes are registered in the dictionary in a step 231 based upon the area mapping command. If it is a main-sub volume command in a step 232, a connection or a disconnection is registered in the dictionary in a step 233 based upon the main-sub volume control command. If the command is not any of the above described command, the process terminates. On the other hand, if the request is determined to be an execution command in the step 225, the code is interpreted for execution in a step 223 and the process terminates. Lastly, the request is determined to be an analysis request in the step 225, an query analysis is performed in a step 220 while an optimization process is executed in a step 221. Based upon the steps 220 and 221, an appropriate code is generated in a step 222, and the process terminates.

Figure 6:
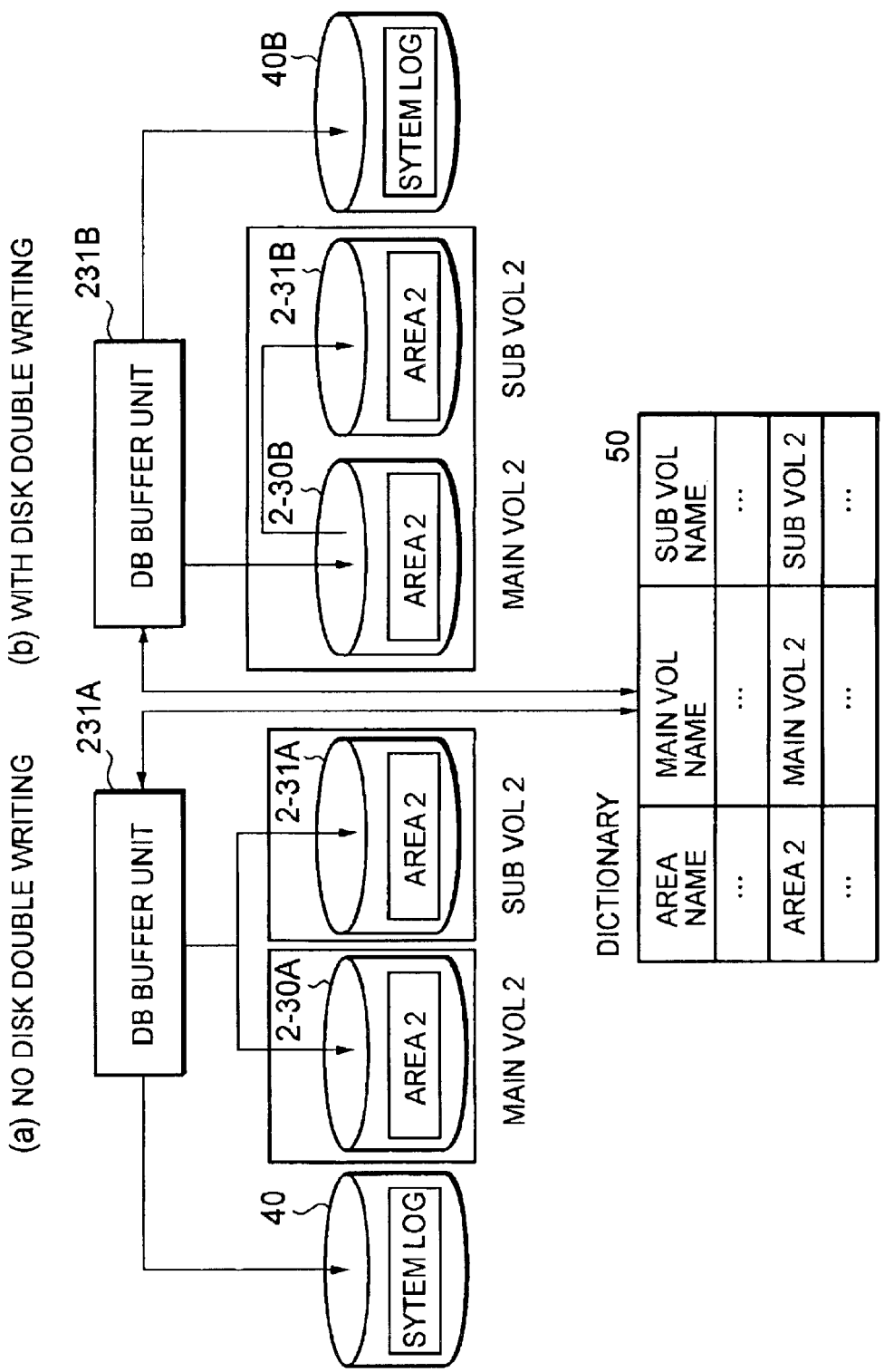
FIG. 6 is a block diagram illustrating preferred disk processes of writing data that are used in the process according to the current invention.

Now referring to FIG. 6, a block diagram illustrates preferred disk processes of writing data that are used in the process according to the current invention. As shown in FIG. 6A, a disk device containing a pair of a main volume and a sub volume writes data without a predetermined automatic duplicating process. A database buffer unit 231A issues a data write command to both a main volume disk 2-30A and a sub volume disk 2-31A that are not equipped with an automatic double writing or duplicating feature. That is, by using certain software, the two disk volumes maintain the same data without the duplicating feature. On the other hand, as shown in FIG. 6B, a database buffer unit 231B issues a data write command to both a main volume disk 2-30B and a sub volume disk 2-31B that are equipped with an automatic double writing or duplicating feature. With the duplicating feature, a disk area 2-30 of the main volume 2-30B has been corresponded to a disk area 2-31 of the sub volume 2-31B. By using the correspondence, the data to be written to the disk area 2-30 will be automatically also written to the disk area 2-31. In other words, the two disk volumes 2-30B and 2-31B maintain the identical data. The following area volume mapping definition corresponds the area 2-30B of the main volume to the area 2-31B of the sub volume.

CREATE AREA 2 as PRIMARY main volume2
  SECONDARY sub volume2;

By the above area volume mapping definition, the dictionary 50 contains information on the names of the volume such as "main volume 2" and "sub volume 2" for the areas such as "area 2."

Figure 7:
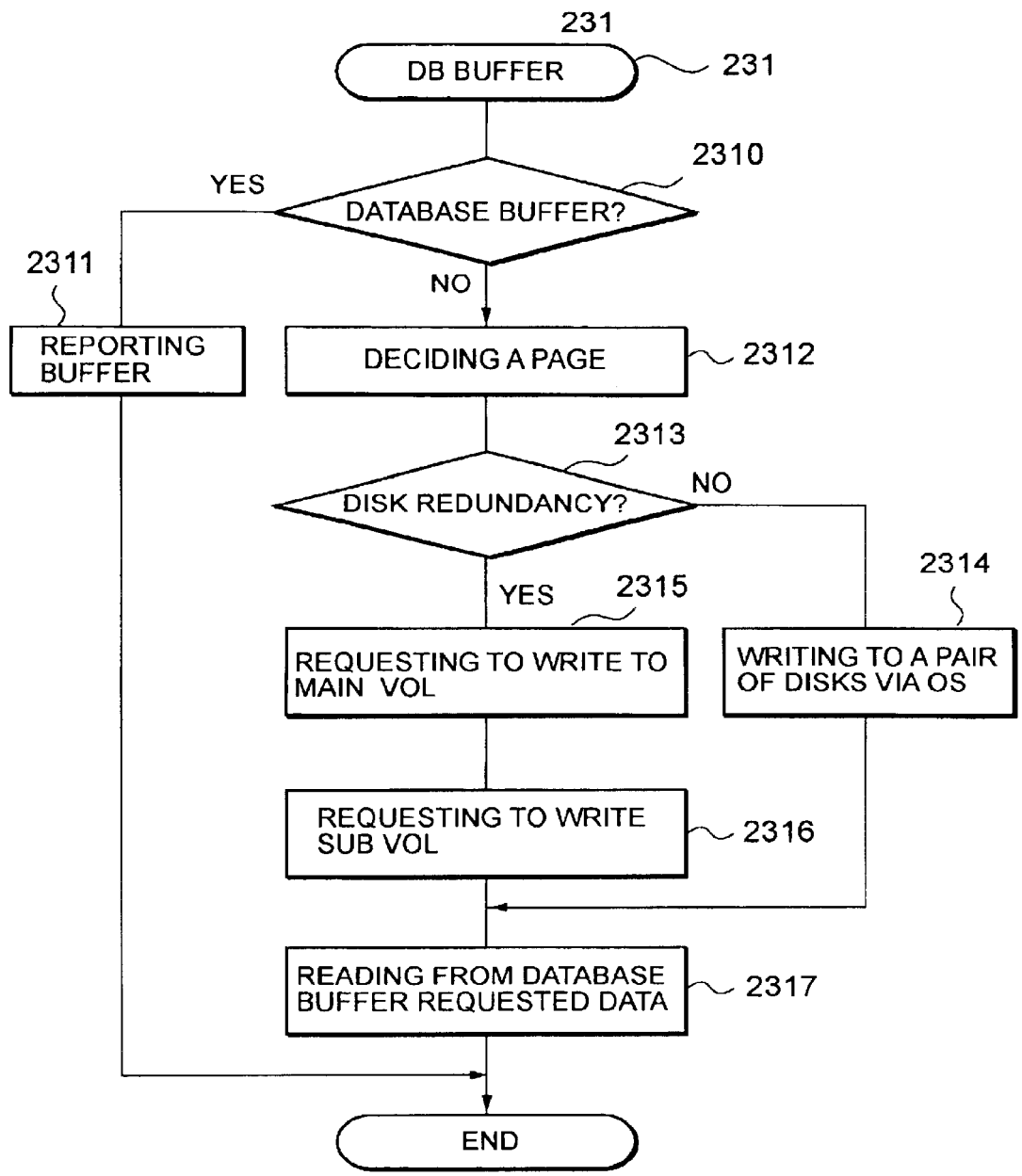
FIG. 7 is a flow chart illustrating the steps involved in a preferred process of managing a database buffer according to the current invention.

FIG. 7 is a flow chart illustrating the steps involved in a preferred process of managing a database buffer according to the current invention. The database buffer unit 231 as shown in FIG. 7 processes the following steps. The database buffer management process is initiated when a write or a read operation is requested to work on a page in the database in a step 231. It is determined whether or not a requested page exists in a predetermined database buffer in a step 2310. If the requested page exists, the preferred process reports the buffer in a step 2311. On the other hand, if the requested page does not exists in the database buffer in the step 2310, a page to be purged is initially determined in a step 2312 before reading the requested page. Then, it is determined whether or not a double writing is necessary in a step 2313. If the disk device is equipped with the double writing feature, the data is written to a pair of the disks via an operating system software program in a step 2314. On the other hand, the disk device is not equipped with the double writing feature, the data is initially written only to a main disk volume in a step 2315. Subsequently, the same data is written to a sub disk volume in a step 2316. Finally, the requested data page is written to the database buffer in a step 2317. The preferred process terminates.

Figure 8:
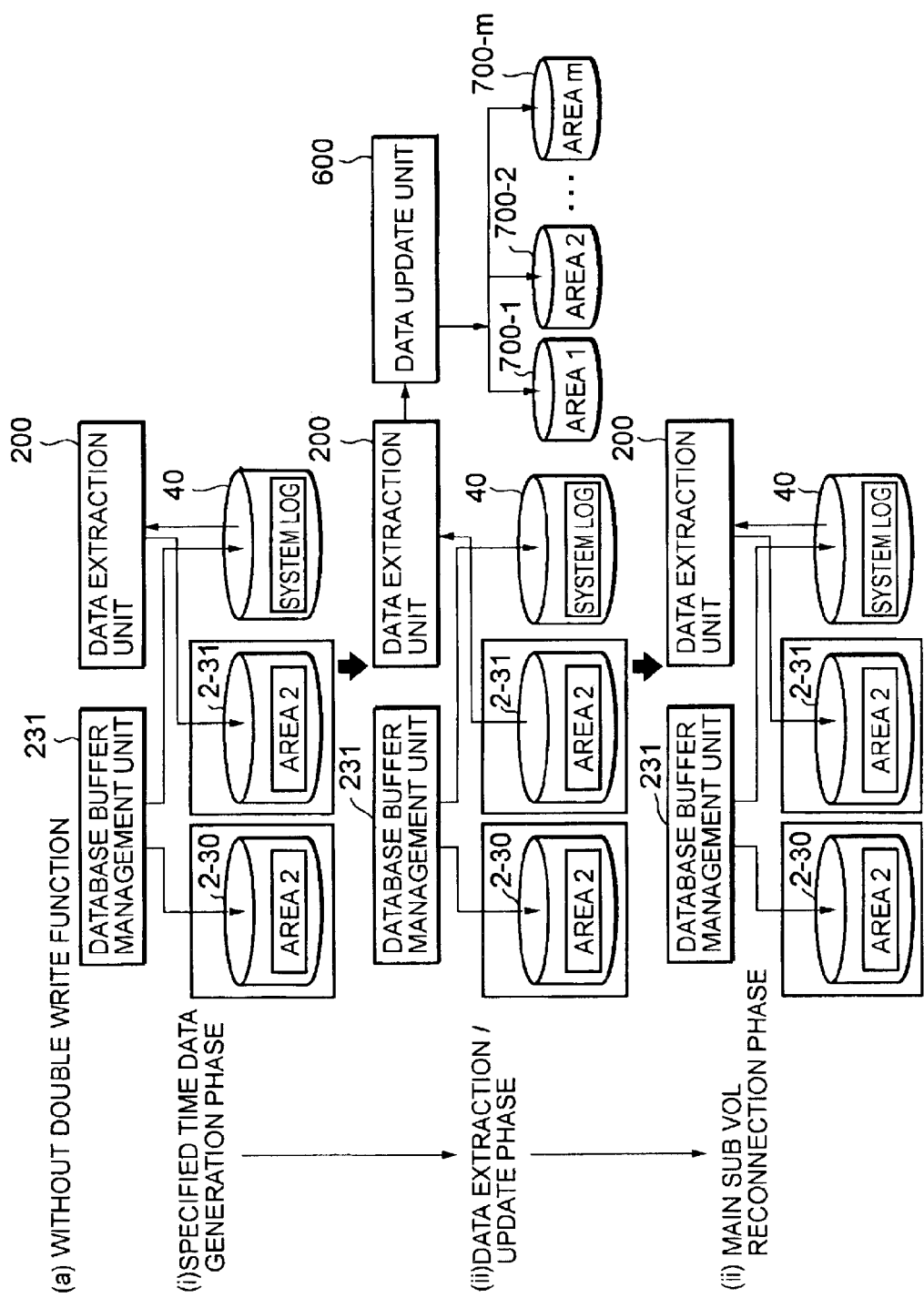
FIG. 8 is a block diagram illustrating one preferred process of updating disk storage units in the database management system according to the current invention.

FIG. 8 is a block diagram illustrating one preferred process of updating disk storage units in the database management system according to the current invention. For example, the disk storage units include a relational database and an OLAP database, and information is updated from the relational database to the OLAP database while the relational database is continuously accessed for transactions. This preferred process is accomplished without the above described double writing feature in the disk storage units. In other words, the data duplication is accomplished by predetermined software. The database management system includes a database buffer management unit 231, a data extraction unit 200, a data update unit 600, a first data storage unit or a main storage volume 2-30, a second data storage unit or a sub storage volume 2-31, a system log unit and a set of third data storage units 700-1 through 700-m. In general, a common database such as a relational database is duplicated and maintained in both the main and sub data storage volumes 2-30 and 2-31 via the database buffer management unit 200. The system log unit 40 maintains the changes that are made to the database stored in the data storage units 2-30 and 2-31.

Still referring to FIG. 8, the database management system follows the following three steps. In a specified time data generation phase (i), the main storage volume 2-30 and the sub storage volume 2-31 are not disassociated, but a mode is set to write only to the main storage volume 2-30 to update its database for the incoming transactions. The database buffer management unit 231 continues to update the data in the main volume storage 2-30 as well as the transaction data in the system log unit 40 in response to continuous transactions. Subsequently, the sub storage volume 2-31 will be rolled back or adjusted to contain complete data as the result of all transactions that have taken place up to a specified point in time. To complete the data in the sub storage volume 2-31 according to the specified time, the data extraction unit 200 extracts a relevant portion of the transaction data in the system log unit 40, and the data in the sub storage volume 2-31 is modified.

In the data extraction /Update phase (ii), the updated or rolled back data in the sub storage volume 2-31 now will be incorporated into a third database such as an OLAP database that is stored in a plurality of disk storage units 700-1 through 700-m. To synchronize the data in the sub storage volume 2-31 and that of the third database, the data extraction unit 200 extracts the relevant portion of the data to be incorporated from the sub storage volume 2-31. Based upon the extracted data, the data update unit 600 updates corresponding portions of the data that are possibly stored in multipack disk storage units of the third database. To determine a disk storage space, a predetermined division schema or method is used.

After the incorporation the relevant new data of the second database into the third database, in the main-sub volume reconnection phase (iii), the second database will be reconnected and synchronized to the first database. Since the first database in the main storage volume 2-30 is being continuously handling all transactions and the two databases are being disconnected during the above described phases (i) and (ii), the second database in the sub storage volume 2-31 is no longer synchronized with the first database in the main storage volume 2-30 by the end of the phase (ii). In the phase (iii), after the main storage volume and the sub storage volume are reconnected, the data extraction unit 200 now extracts relevant information from the system log unit 200 so as to roll forward the data in the sub storage volume 2-31. That is, the relevant information accounts for the transactions that had taken place in the first database in the disconnected main storage volume 2-30 during the phases (i) and (ii) so that the first database in the main storage volume 2-30 and the second database in the sub storage volume 2-31 are again synchronized.

Figure 9:
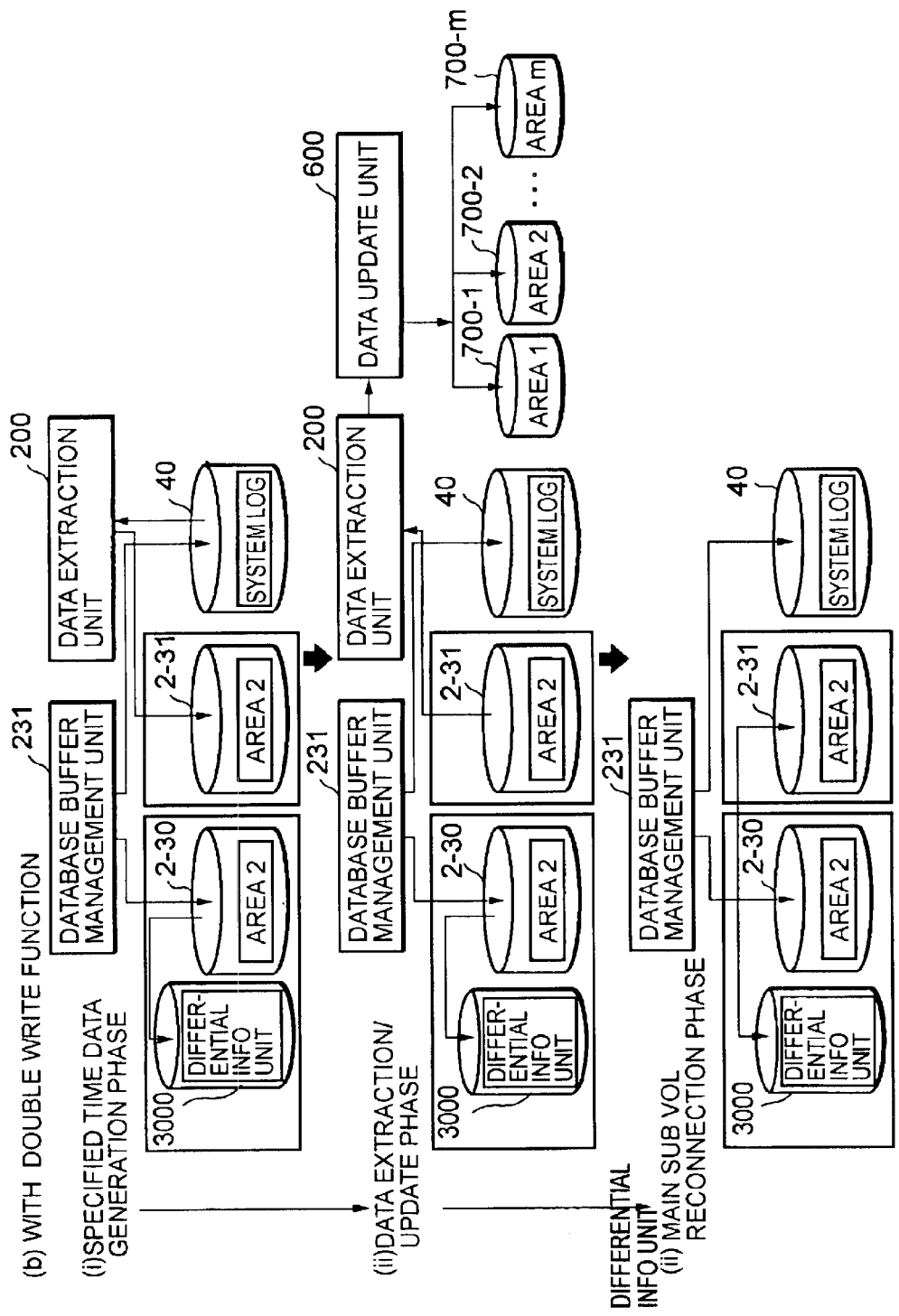
FIG. 9 is a block diagram illustrating a second preferred process of updating disk storage units in the database management system according to the current invention.

FIG. 9 is a block diagram illustrating a second preferred process of updating disk storage units in the database management system according to the current invention. For example, the disk storage units include a relational database and an OLAP database, and information is updated from the relational database to the OLAP database while the relational database is continuously accessed for transactions. This preferred process is accomplished with the above described double writing feature in the disk storage units. In other words, the data duplication is accomplished with a help of a certain hardware unit such as a differential information unit 3000. The database management system includes a database buffer management unit 231, a data extraction unit 200, data update unit 600, a first data storage unit or a main storage volume 2-30, a second data storage unit or a sub storage volume 2-31, a system log unit, a differential information unit 3000 and a set of third data storage units 700-1 through 702-m. In general, a common database such as a relational data base is duplicated and maintained in both the main and sub data storage volumes 2-30 and 2-31 via the database buffer management unit 200. The system log unit 40 as well as the differential information unit 3000 maintain the changes that are made to the database stored in the data storage units 2-30 and 2-31.

Still referring to FIG. 9, the database management system follows the following three steps. In a specified time data generation phase (i), the main storage volume 2-30 and the sub storage volume 2-31 are disassociated, and the sub storage volume 2-31 is disconnected to update its database for the incoming transactions. The database buffer management unit 231 continues to update the data in the main volume storage 2-30 as well as the transaction data in the system log unit 40 in response to continuous transactions. In addition, in response to certain disk operations, the main storage volume 2-31 also updates the information in the differential information unit 3000. Subsequently, the sub storage volume 2-31 will be rolled back or adjusted to contain complete data as the result of all transactions that have taken place up to a specified point in time. To complete the data in the sub storage volume 2-31 according to the specified time, the data extraction unit 200 extracts a relevant portion of the transaction data in the system log unit 40, and the data in the sub storage volume 2-31 is modified.

In the data extraction /Update phase (ii), the updated or rolled back data in the sub storage volume 2-31 now will be incorporated into a third database such as an OLAF database that is stored in a plurality of disk storage units 700-1 through 700-m. To synchronize the data in the sub storage volume 2-31 and that of the third database, the data extraction unit 200 extracts the relevant portion of the data to be incorporated from the sub storage volume 2-31. Based upon the extracted data, the data update unit 600 updates corresponding portions of the data that are possibly stored in multiple disk storage units of the third database. To determine a disk storage space, a predetermined division schema or method is used.

After the incorporation the relevant new data of the second database into the third database, in the main-sub volume reconnection phase (iii), the second database will be reconnected and synchronized to the first database. Since the first database in the main storage volume 2-30 is being continuously handling all transactions and the two databases are being disconnected during the above described phases (i) and (ii), the second database in the sub storage volume 2-31 is no longer synchronized with the first database in the main storage volume 2-30 by the end of the phase (ii). In the phase (iii), after the main storage volume and the sub storage volume are reconnected, the differential information unit 3000 rolls forward the data in the sub storage volume 2-31 based upon the relevant information. That is, the relevant information accounts for the transactions that had taken place in the first database in the disconnected main storage volume 2-30 during the phases (i) and (ii) so that the first database in the main storage volume 2-30 and the second database in the sub storage volume 2-31 are again synchronized.

Figure 10:
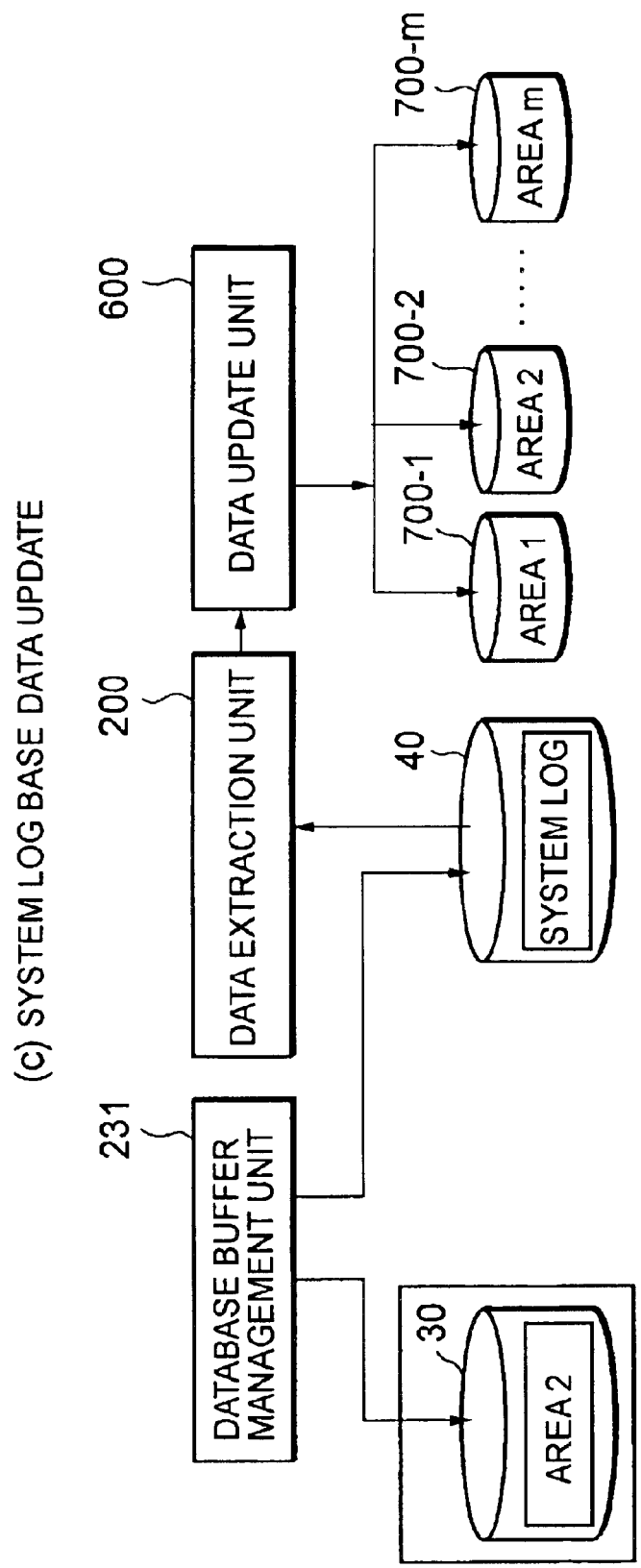
FIG. 10 is a block diagram illustrating a third preferred process of updating disk storage units in the database management system according to the current invention.

Now referring to FIG. 10, a block diagram illustrates a third preferred process of updating disk storage units in the database management system according to the current invention. The third preferred process is accomplished without the above described double writing feature in the disk storage units. In other words, the data duplication is accomplished by predetermined software. The database management system includes a database buffer management unit 231, a data extraction unit 200, a data update unit 600, a first data storage unit or a main storage volume 2-30, a system log unit and a set of additional data storage units 700-1 through 700-m In general, a database such as a relational data base is maintained in the main data storage volume 2-30 via the database buffer management unit 200. The system log unit 40 maintains the changes that are made to the database stored in the data storage unit 2-30 as well as a system log point which indicates a time of the last update of a database in the additional data storage units 700-1 through 700-m based upon the data stored in the system log unit 40. Upon specifying a new time, the data extraction unit 200 extracts a relevant portion of information from the system log unit 40, and the data update unit 600 updates the data in the additional data storage units 700-1 through 700-m for a period between the last update time and the currently specified new time. The data update unit 600 updates the additional database according to a predetermined division schema.

Figure 11:
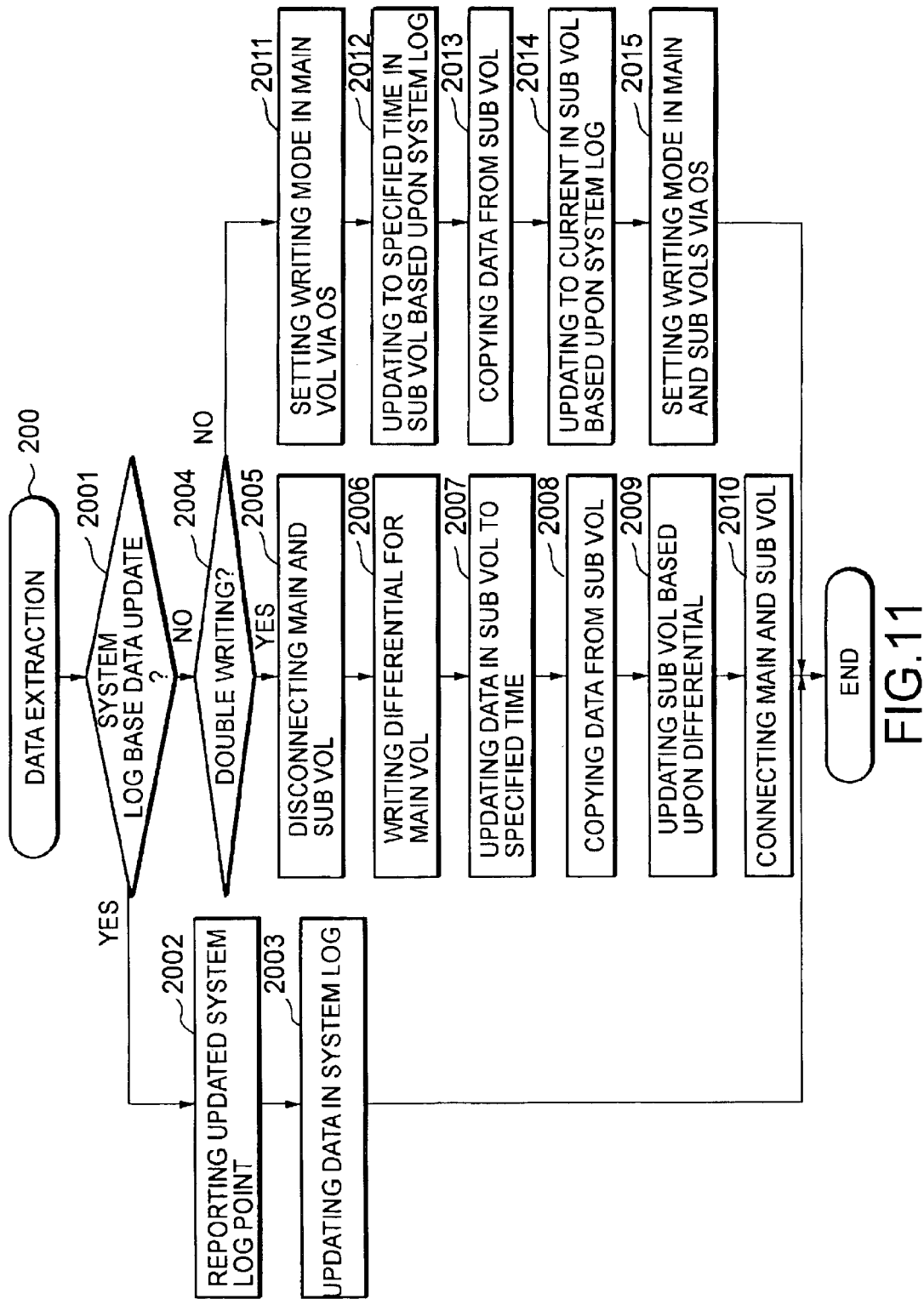
FIG. 11 is a flow chart summarizing the steps involved in the above described first, second and third preferred processes of managing a plurality of databases according to the current invention.

Now referring to FIG. 11, a flow chart summarizing the steps involved in the above described first, second and third preferred processes of managing a plurality of databases according to the current invention. The data extraction unit 200 and the data update unit 600 as shown in FIGS. 8, 9 and 10 process the following steps. It is determined in a step 2001 whether or not a current update is a system-log-based data update as described with respect to FIG. 10. If the current update is indeed a system-log-based data update, the last system log update point is reported in a step 2002. Subsequently, the data corresponding to a period between the last system log update point and a currently specified time is updated in a step 2003 and the preferred process terminates. On the other hand, if the step 2001 determines that the current update is not a system-log-based data update, it is further determined whether or not the disk devices are equipped with the above described double writing feature in a step 2004.

Still referring to FIG. 11, if the disk devices are equipped with the double writing feature, the main storage volume 2-30 and the sub storage volume 2-31 are disassociated in a step 2005. At the same time, the differential information unit 3000 is placed in a predetermined mode to record the information that reflects the changes to the main storage volume 2-30 in a step 2006. Based upon the information in the system log unit 40, the data in the sub storage volume 2-31 is rolled back or adjusted to a specified time in a step 2007. The adjusted or rolled back data in the sub storage volume 2-31 is incorporated into a third database in a step 2008. Upon completion of the step 2008, based upon the differential information unit 3000, the data in the sub storage volume 2-31 is rolled forward to be synchronized with the database in the main storage volume 2-30. Finally, the main storage volume 2-30 and the sub storage volume 2-31 are associated again in a step 2010, and the preferred process terminates.

On the other hand, if the disk devices are not equipped with the double writing feature, the operating system is set in a mode to write only to the main storage volume 2-30 in a step 2011. In other words, the sub storage volume 2-31 is left intact from the future incoming transactions. Based upon the information in the system log unit 40, the data in the sub storage volume 2-31 is rolled back or adjusted to a specified time in a step 2012. The adjusted or rolled back data in the sub storage volume 2-31 is incorporated into a third database in a step 2013. Upon completion of the step 2013, based upon the system log unit 40, the data in the sub storage volume 2-31 is rolled forward to be synchronized with the database in the main storage volume 2-30. Finally, the operating system is set in an original mode to write to both the main storage volume 2-30 and the sub storage volume 2-31 in a step 2015, and the preferred process terminates.

Figure 12:
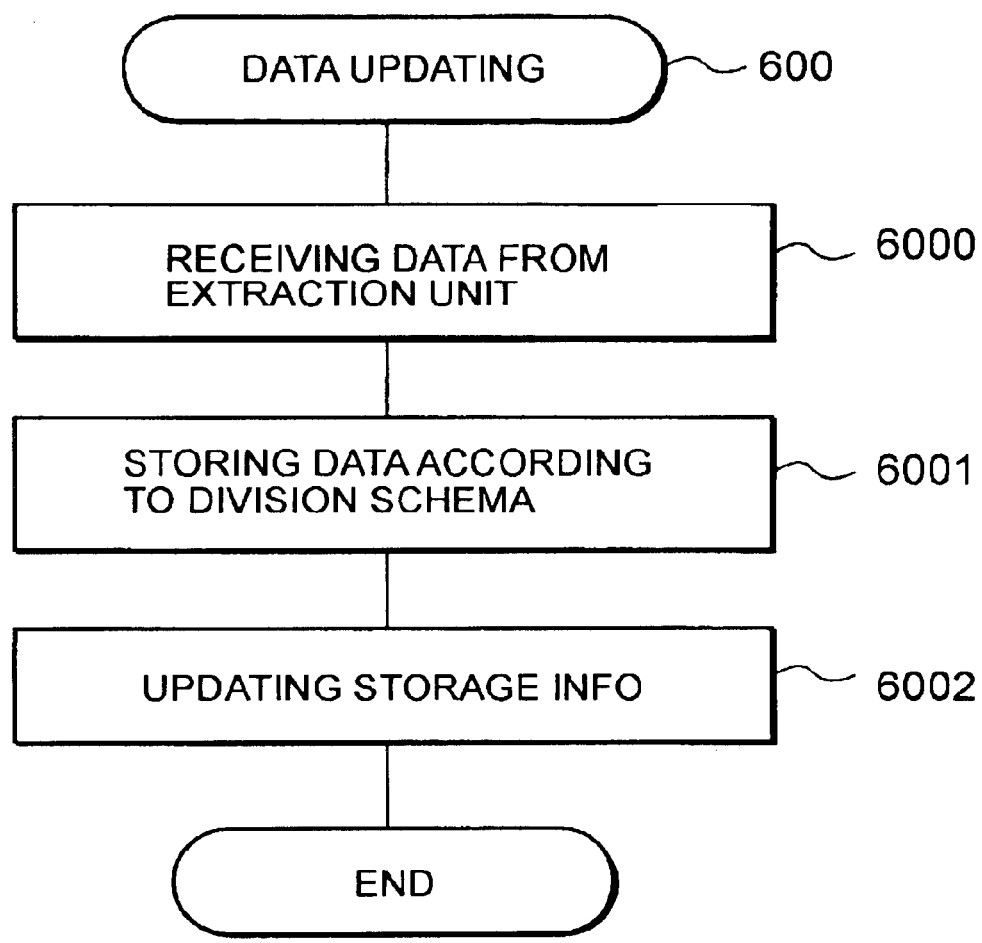
FIG. 12 is a flow chart illustrating steps involved in a preferred process of incorporating the extracted data according to the current invention.

FIG. 12 is a flow chart illustrating steps involved in a preferred process of incorporating the extracted data according to the current invention. The data update unit 600 as shown in FIGS. 8, 9 and 10 processes the following steps. In a step 6000, the data update unit 600 receives data from a data extraction unit 200, and based upon the received data, the data update unit 600 initializes a new record and incorporates the data. The incorporated data is now stored in a physical area in a storage device associated with the third database, and the physical area is determined by a predetermined division schema or method in a step 6001. If the third database is an OLAP database system, a summary/management database for the OLAP database is also updated based upon the newly incorporated data in a step 6002, and the preferred process terminates.

Referring to FIGS. 13A and 13B, a comparison is made between a relational database system and a hybrid relational-OLAP database system. In particular, FIG. 13A illustrates a pair of a first relational database 301 and a second relational database 302 that contains a duplicate set of data. As described above, based upon a new set of transactions, the data in the first database 301 is first updated. Subsequently or simultaneously, the newly updated data is incorporated into the second database 302. Since the first database 301 and the second database 302 share the same format, the data in the two databases is substantially identical. Because of the identical data, when an inquiry or an access is made to the second database 302, the format for the inquiry or the access is also the same as that of the first database 301.

On the other hand, referring to FIG. 13B, a first relational database 301 is functionally paired to an OLAP database 701 along with an information management unit 9000. Based upon a new set of transactions, the data in the first database 301 is first updated. Subsequently or simultaneously, the newly updated data is incorporated into the OLAP database 701. To initially incorporate data in the OLAP database from the relational database, all the history data is downloaded from the relational database, and the OLAP database generates the initial data based upon the down loaded data. To later update or reflect the new data in the relational data on the OLAP database, the OLAP database incorporates a portion of newly added history data. In other words, the newly added portion is reflected upon the OLAP database. These two types of the database service must be provided without any interruption to the database access.

Still referring to FIG. 13B, in the relational-OLAP database system, when an inquiry is made to the OLAP database 701, a combination of the data in the OLAP database 701 and the data in the information management unit 9000 is used to respond to the inquiry. The information management unit 9000 contains data regarding an update period, time, geographical classifications, and client classifications. While the relational database manages data on facts, the OLAP system yields a trend analysis from the relational database with the help of a particular set of business requirements that is stored in the information management unit 9000. For example, for customer analyses, it is necessary to analyze the sales data in various manners such as chronological analyses including time and frequency, regional sales amounts for sales items. For the chronological analyses, in order to analyze the sales data, a unit of time comparison such as a year, a quarter, a week and a day, the data 701 in the OLAP system needs to be organized from the fact data 301 in the relational database according to the above time analysis units. In other words, a time-related OLAP inquiry is correctly responded only when the information management unit 9000 and the OLAP database are maintained for the requested time units. The information management unit 9000 maintains data on the updated status of the OLAP database as well as data on the organization of the OLAP database. As a result, in response to a summary inquiry is made to the relational database 301, the OLAP system and the information management unit 9000 output an appropriate summary/trend analysis results.

For example, a typical sales record database access is speculated to be 7.7 million times per day based upon the actual sales retail data for a major retail chain. Each sales record ranges from 200 bytes to 1 K bytes. The amount of a monthly sales database ranges from 40 Giga bytes to 200 Giga bytes while that of an annual sales database ranges from 2 Tetra bytes to 4 Tetra bytes. The above sales databases form a star schema and are used for generating statistical summaries based upon SQL inquiries. Furthermore, in order to analyze the sales data in diversified manners, an OLAP system is used. After 18 to 24 months of sales data are built, it becomes necessary to analyze the sales data for each of the sales territories, a comparison of sales data of the same item among the months and a predetermined length of periods. For some cases, since 80% of the data access is concentrated only on three months, it is necessary to increase the resolution in understanding these data.

Figure 14:
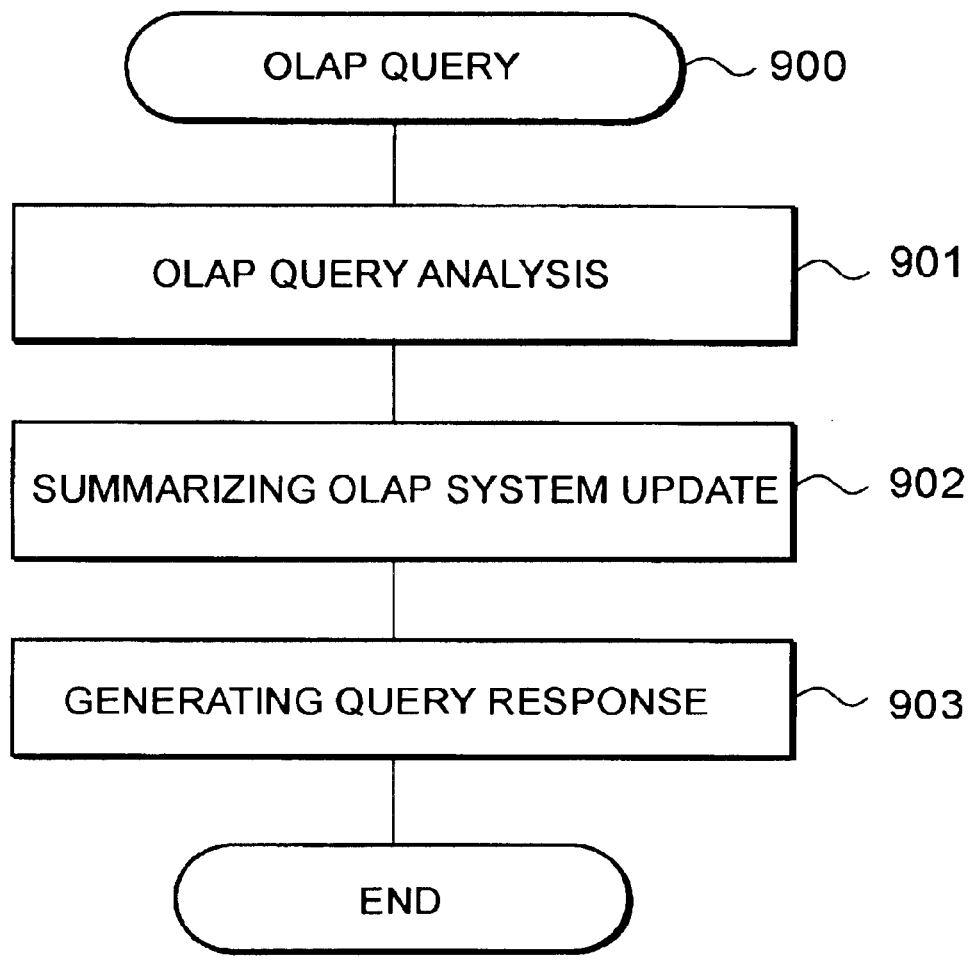
FIG. 14 is a flow chart illustrating steps involved in a preferred process of generating a response to an OLAP inquiry according to the current invention.

Now referring to FIG. 14, a flow chart illustrates steps involved in a preferred process of generating a response to an OLAP inquiry according to the current invention. The OLAP system as described above with respect to FIG. 13B will perform the following steps. In response to an OLAP inquiry in a step 900, the OLAP system initially analyzes the inquiry itself to determine which a portion of the database 701 will be accessed in a step 901. In a step 902, the OLAP system then determines the update status of the OLAP database and generates a portion of a response to the inquiry. Lastly, the OLAP system accesses the above determined relevant portion of the database 701 and merges the accessed data with the already generated partial response before returning the merged response in step 903. The preferred process then terminates.

Figure 15:
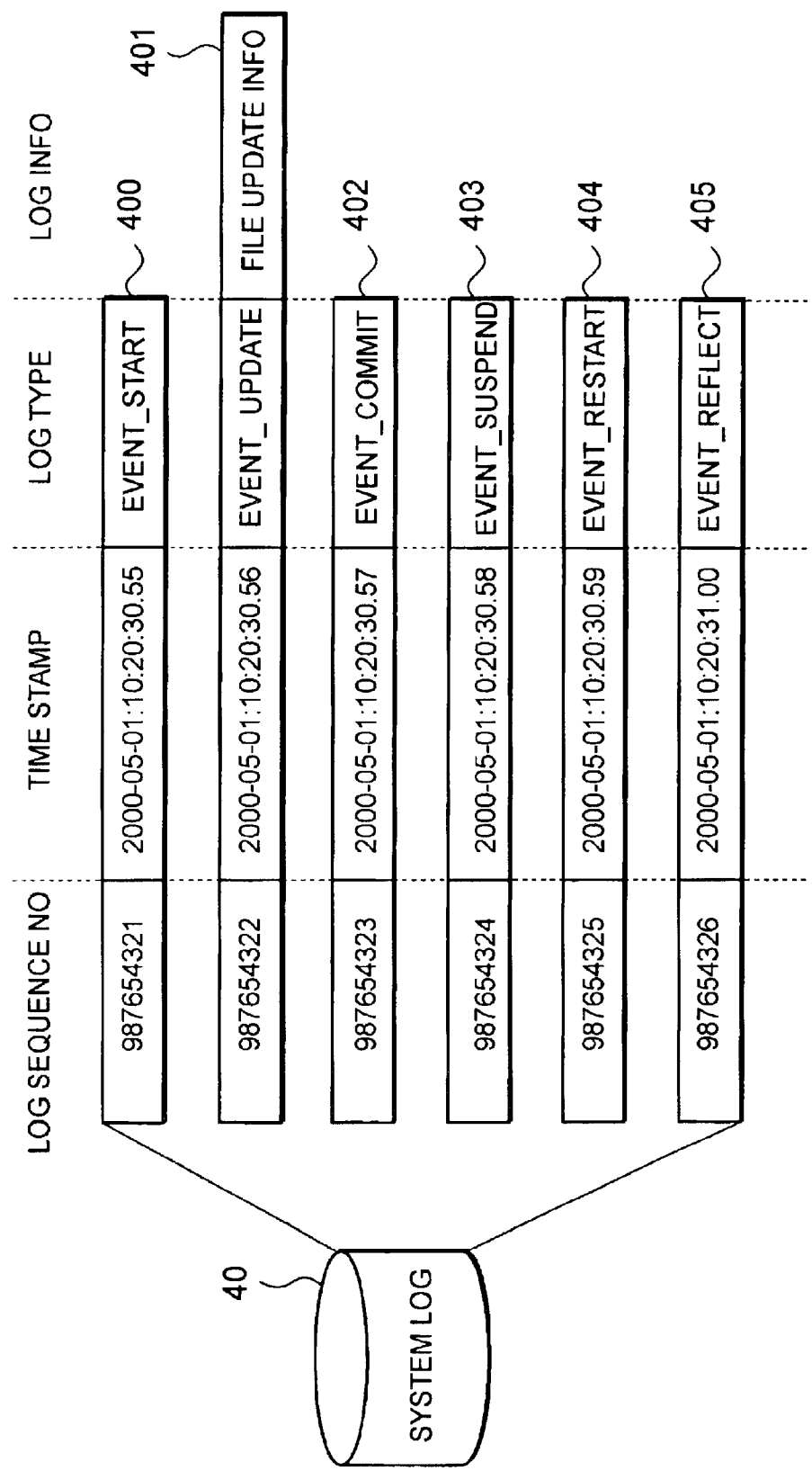
FIG. 15 is a table illustrating exemplary content of the system log.

Referring to FIG. 15, exemplary content of the system log is illustrated in a table. The exemplary system log includes information on a log sequence number, a time stamp, a log type and log information. The log sequence number is a unique number to be used in the relational database. The time stamp records time of a logged event. The log types include a start event (event_start) of the data extraction and incorporation process; a suspension event (event_suspend) suspending the extraction or incorporation process; a restart of the start event (event_restart) restarting the suspension event; a data commit event (event_commit) committing the data for a process; a data update event (event_update) updating data; and a data extraction reflect event (event_reflect) reflecting or incorporating the data. The log information records information on a history of updates of the database. Based upon the above described system log, the multiple database management unit extracts data from the relational database and updates the OLAP database based upon the extracted data.

The above described current invention is implemented in many forms. One implementation is a large-scale computer network while another implementation is a group of small-scale distributed processors. A single processor is also optionally used for a distributed system. It is also optional to share a plurality of disk storage units among the processors. Similarly, the software that implements the above described process such as illustrate in FIG. 2 is stored in a floppy disk and a hard disk that are accessed through a network.

As mentioned above, it is necessary to provide the database services without interrupting the access to relational or OLAP systems. In order to provide efficient non-stop database access, the following two issues are considered. A first issue is that since the relational and OLAP databases access an overlapping memory area, the relational database system generally has a lowered performance level. A second issue is that approximately 80% of OLAP access is generally focused on recent data or a small portion of the data. To alleviate the above issues, one solution is to have physically separate areas in a database by disk special features or OS double-writing feature since the most access areas in the database are either added some new data or read for updating the corresponding database in the OLAP server. These database areas are synchronized for writing and physically isolated. For example, the physically isolated areas include a main storage volume for adding data and reading as well as a sub storage volume for rolling forward or backward to a specified time. A second solution is to use a system log that is originally designed to provide a database recovery mechanism. Since the system log records every database transaction, the transaction information is isolated to a particular time point. In order to incorporate the data in the OLAP database, desired data is generated based upon an isolated portion of the system log data. A third solution is to localize an area for incorporating new data in the OLAP server. By multiple layers of divisions, the recent data that is 80% of access is further divided in order to increase row effect. The chronologically concentrated data is thus further divided by sorting methods such as a Hashing algorithm and a key value to lower the access load.

In is necessary to make the relational database available to the OLAP system, and the relational database has been adjusted to a specified time prior to the availability. This is because when data from the relational database is incorporated into the OLAP database, it is necessary to analyze the OLAP database that has been adjusted to a specified time. In order to accommodate the above issue, the following solutions are provided. A first solution is to manage the relational database in chronologically divided units. Because of the chronological division, the range of access for adding new data is limited to a narrow area. In the relational database side, by keeping track of how far the update in the OLAP system has been accomplished, a next range of access is easily determined. A second solution is to update the OLAP database based upon a system log in which information on updating the OLAP database is kept. The system log information includes the history data of incorporating data from the relational database into the OLAP database in a table format, and a certain entry is selected in the table to use during the data incorporation.

In combination with the above described SAN solution, servers for processing a database and storage units for storing the databases are connected via a high-speed network such as optical fibers. By modifying mapping information between the storage units and the servers, the servers and the storage units are easily and flexibly operated. Furthermore, since each storage unit employs the RAID structure, the redundancy is secured for the database operation and the necessary storage areas are used as flexible devices. The storage access is not interrupted without stopping the normal operation when the database system is reorganized or restructured. One concrete example of the database reorganization is to add a server and or a disk unit in order to enlarge the database system, and this example also shows that the system is scalable.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of managing a plurality of databases in response to continuous transactions, the databases including at least a first database and a second database, comprising:
concurrently maintaining a duplicate pair of first data and second data in a first format in the first database in response to database transactions;
maintaining third data in a second format in the second database, the second format being organized to summarize the first data and the second data;
determining a point in time for a predetermined database management task;
discontinuing the database transactions to and from the first data in the first database;
continuing the database transactions to and from the second data in the first database;
rolling back the first data in the first database to the point in time;
connecting the first data in the first database and the third data in the second database;
updating the third data in the second database based upon the rolled back first data in
the first database;
rolling forward the first data in the first database to match the second data in the first database; and
resuming the database transactions to and from the first data and the second data in the first database.

2. The method of managing a plurality of databases according to claim 1 further comprising updating a system log for keeping records for changes in the first database.

3. The method of managing a plurality of databases according to claim 2 wherein said rolling back of the first data in the first database is accomplished based upon the system log.

4. The method of managing a plurality of databases according to claim 2 wherein said rolling forward of the first data in the first database is accomplished based upon the system log.

5. The method of managing a plurality of databases according to claim 1 wherein the first database and the second database are maintained by a disk hardware unit.

6. The method of managing a plurality of databases according to claim 1 wherein the first database and the second database are maintained by a software program.

7. The method of managing a plurality of databases according to claim 1 wherein said resolving the first data in the first database and the third data in the second database is accomplished by copying the first data from the first database into the second database.

8. The method of managing a plurality of databases according to claim 7 wherein said copying the second data is accomplished for balancing a load among storage areas within the second database.

9. The method of managing a plurality of databases according to claim 8 wherein said balancing is accomplished by a predetermined sort algorithm.

10. The method of managing a plurality of databases according to claim 1 further comprising updating a differential log for keeping records for changes in the first database.

11. The method of managing a plurality of databases according to claim 1 wherein the first format is in a relational database while the second format is in an Online-Line Analysis Process (OLAP) database.

12. The method of managing a plurality of databases according to claim 11 further comprising an additional step of maintaining fourth data in a third format in an information management database, the third format include information on an update status of the third data in the second database.

13. The method of managing a plurality of databases according to claim 1 further comprising an additional step of inquiring a predetermined type of summary information to the first database, the first database and the information management database generating a response.

14. A system for managing a plurality of databases in response to continuous transactions, the databases including at least a first database, a second database and a third database, comprising:
a first database storage unit for storing first data in a first format in first database;
a second database storage unit for storing a duplicate set of second data in the first format in second database;
a third database storage unit for storing third data in a second format in third database, the third data summarizing the first data and the second data in the second format;
an information management unit for storing fourth data on an updated status of the third data with respect to the first data and the second data; and
a database management unit connected to said first database storage unit, said second database storage unit and said third database storage unit for continuing database transactions to and from the first database as well as concurrently maintaining the first data in the first database and the duplicate set of the second data in the second database, said database management unit determining a point in time for a predetermined database management task and discontinuing the database transactions to and from the second database so as to roll back the second data in the second database to said point in time, said database management unit connecting the second data in the second database to the third data in the third database, said database management unit updating the third data in the third database based upon the rolled back second data in the second database and recording the updated status in said information management unit, said database management unit rolling forward the second data in the second database to match the first data in the first database so as to resume the database transactions to and from the second database in said second database storage unit.

15. The system for managing a plurality of databases according to claim 14 further comprises a system log unit connected to said database management unit for updating a system log for keeping records for changes in the first database.

16. The system for managing a plurality of databases according to claim 15 wherein said database management unit rolls back the second data in the second database based upon said system log.

17. The system for managing a plurality of databases according to claim 15 wherein said database management unit rolls forward the second data in the second database based upon said system log.

18. The system for managing a plurality of databases according to claim 14 further comprising a differential information unit connected to said first database storage unit for automatically updating the second database according to a disk write operation to the first database.

19. The system for managing a plurality of databases according to claim 14 wherein said database management unit further comprises a database extraction unit connected to said second database storage unit for extracting a portion of the second data from the second database and a database incorporating unit connected to said database extraction unit and said third database storage unit for incorporating the portion of the second data to the third data in the third database.

20. The system for managing a plurality of databases according to claim 19 wherein said database incorporating unit balances a load among storage areas within said third database storage unit.

21. The system for managing a plurality of databases according to claim 20 wherein said database incorporating unit balances according to a predetermined sort algorithm.

22. The system for managing a plurality of databases according to claim 14 wherein the first format is in a relational database while the second format is in an Online-Line Analysis Process (OLAP) database.

23. The system for managing a plurality of databases according to claim 14 further comprising a data inquiring unit for requesting a predetermined type of summary information to the first database, said third database storage unit and said information management unit generating a response.

* * * * *